(12) United States Patent
De Visscher

(10) Patent No.: US 9,683,660 B2
(45) Date of Patent: *Jun. 20, 2017

(54) METHOD OF CONTROLLING A DOUBLE CLUTCH IN A VEHICLE TRANSMISSION, AND CLUTCH CONTROL SYSTEM FOR CONTROLLING A DOUBLE CLUTCH

(71) Applicant: TRANSMISIONES Y EQUIPOS MECANICOS, S.A. DE C.V., Juarez Queretaro (MX)

(72) Inventor: Nico De Visscher, Laarne (BE)

(73) Assignee: TRANSMISIONES Y EQUIPOS MECANICOS, S.A. DE C.V. (MX)

( * ) Notice: Subject to any disclaimer, the term of this patent is extended or adjusted under 35 U.S.C. 154(b) by 85 days.

This patent is subject to a terminal disclaimer.

(21) Appl. No.: 14/788,544

(22) Filed: Jun. 30, 2015

(65) Prior Publication Data

US 2015/0300487 A1 Oct. 22, 2015

Related U.S. Application Data

(63) Continuation of application No. 13/989,333, filed as application No. PCT/EP2011/005825 on Nov. 18, 2011, now Pat. No. 9,103,388.

(30) Foreign Application Priority Data

Nov. 25, 2010 (EP) ..................... 10015007

(51) Int. Cl.
| | |
|---|---|
| *F16D 21/04* | (2006.01) |
| *F16H 61/688* | (2006.01) |
| *F16D 48/02* | (2006.01) |
| *F16H 61/06* | (2006.01) |
| *F16H 59/18* | (2006.01) |
| *F16H 59/36* | (2006.01) |
| *F16H 61/00* | (2006.01) |

(52) U.S. Cl.
CPC .......... *F16H 61/688* (2013.01); *F16D 21/04* (2013.01); *F16D 48/0206* (2013.01);
(Continued)

(58) Field of Classification Search
CPC ...... F16H 61/688; F16H 59/396; F16H 59/18; F16H 61/061; F16H 2306/18;
(Continued)

(56) References Cited

U.S. PATENT DOCUMENTS

| 5,890,392 A | 4/1999 | Ludanek et al. |
| 6,086,514 A | 7/2000 | Jones et al. |

(Continued)

FOREIGN PATENT DOCUMENTS

| EP | 0411558 A1 | 2/1991 |
| EP | 1717473 A1 | 11/2006 |

(Continued)

OTHER PUBLICATIONS

European Patent Office, Office Action dated Mar. 11, 2013 for EP App. No. 10015007.7, 7 pages.

*Primary Examiner* — Roger Pang
(74) *Attorney, Agent, or Firm* — Schwabe, Williamson & Wyatt

(57) ABSTRACT

The present invention concerns a method of controlling a double clutch transmission (1) comprising two clutches (2a, 2b) one of which that is transmitting torque being the active clutch while the other one constituting the incoming clutch characterized by combining the incoming clutch preparation and the torque handover from the active clutch by over actuating the incoming clutch and shutting off the active clutch in a non proportional way, based on a feedback signal from the incoming clutch.

20 Claims, 4 Drawing Sheets

(52) U.S. Cl.
CPC ............ *F16H 59/18* (2013.01); *F16H 59/36* (2013.01); *F16H 61/061* (2013.01); *F16D 2048/0278* (2013.01); *F16D 2500/1026* (2013.01); *F16D 2500/1086* (2013.01); *F16D 2500/3024* (2013.01); *F16D 2500/70414* (2013.01); *F16H 2059/366* (2013.01); *F16H 2061/0078* (2013.01); *F16H 2061/062* (2013.01); *F16H 2306/18* (2013.01)

(58) Field of Classification Search
CPC ....... F16H 2059/366; F16H 2061/0078; F16H 2061/062; F16D 21/04; F16D 48/02096; F16D 2500/70414; F16D 2500/1086; F16D 2048/0278
See application file for complete search history.

(56) References Cited

U.S. PATENT DOCUMENTS

| | | | | |
|---|---|---|---|---|
| 9,103,388 | B2* | 8/2015 | De Visscher | ....... F16D 48/0206 |
| 2003/0054920 | A1* | 3/2003 | Berger | ................. B60W 10/02 |
| | | | | 477/70 |
| 2004/0198552 | A1 | 10/2004 | Bothe et al. | |
| 2004/0224818 | A1* | 11/2004 | Leising | ................. B60W 10/06 |
| | | | | 477/77 |
| 2007/0074944 | A1 | 4/2007 | Leibbrandt et al. | |
| 2007/0123388 | A1 | 5/2007 | Petrzik et al. | |
| 2009/0125201 | A1 | 5/2009 | Leibbrandt et al. | |
| 2010/0268427 | A1 | 10/2010 | Kabrich | |
| 2012/0216640 | A1 | 8/2012 | Hoffmeister et al. | |
| 2013/0144497 | A1* | 6/2013 | Naqvi | ..................... F16H 61/08 |
| | | | | 701/51 |
| 2013/0197769 | A1* | 8/2013 | Schneider | ........... F16H 61/0403 |
| | | | | 701/68 |

FOREIGN PATENT DOCUMENTS

| | | |
|---|---|---|
| EP | 2239484 A1 | 10/2010 |
| EP | 2458249 A1 | 5/2012 |
| JP | 2010078118 A | 4/2010 |
| WO | 0138121 A1 | 5/2001 |
| WO | 2012069165 A1 | 5/2012 |

* cited by examiner

METHOD OF CONTROLLING A DOUBLE CLUTCH IN A VEHICLE TRANSMISSION, AND CLUTCH CONTROL SYSTEM FOR CONTROLLING A DOUBLE CLUTCH

CROSS REFERENCE TO RELATED APPLICATION

This application is a continuation patent application of U.S. patent application Ser. No. 13/989,333, filed Sep. 12, 2013, now U.S. Pat. No. 9,103,388, which is a U.S. national phase filing of PCT Application No. PCT/EP2011/005825, filed Nov. 18, 2011, which is an international application of European Patent Application No. 10015007.7, filed Nov. 25, 2010, now European Patent No. 2458249, published May 30, 2012, the disclosures of which are herein incorporated by reference in their entireties.

FIELD OF THE INVENTION

The invention concerns a method of controlling a double clutch in a vehicle transmission for transferring torque transmission from an active clutch to an incoming clutch.

BACKGROUND AND OVERVIEW

FIG. 1 shows a Double Clutch Transmission (DCT) 1 which is adapted for transmitting a torque from an engine E to a differential D to which two vehicle wheels are operatively connected. Double Clutch Transmission 1 comprises a double clutch 2 with a hollow shaft 3 and a central output shaft 4. The clutch housing 5 is connected to the engine crankshaft 6. Both clutches 2a, 2b of clutch 2 are controlled by hydraulic pistons (not shown) integrated into the clutch housing 5. The central and hollow shafts 4 and 3 are connected to two separate gear sets 7, 8 each with their own synchronizers (not shown). One shaft 4 drives gear set 7 which comprises the odd gear ratios while the other shaft 3 drives gear set 8 which comprises the even gear ratios. While one clutch 2a or 2b is active, meaning that torque from engine E is being transferred to the respective gear set 7,8, the other clutch 2b or 2a remains open, meaning that no torque is being transferred to the respective other gear set 2b, 2a. Accordingly, a new gear can be selected via the synchronizer actuators among the gears in the currently inactive gear set 2b, 2a.

By alternately coupling the central and the hollow shaft—with the synchronizers having selected the correct gear—shifts can be performed.

FIG. 2 shows an example of a possible hydraulic schema for controlling a double clutch, comprising a pressure supply 9 followed by a proportional actuator 10, a non-proportional actuator 11, a pressure sensor 12 and a connection 13a and 13b for each of the hydraulic pistons used in the two clutches 2a and 2b.

Conventional double clutch shifts are performed as powershifts, meaning there is no torque interruption during the shift. To perform this kind of powershifts the incoming clutch needs to take over torque while the active clutch still transfers torque.

On the graph of FIG. 3 showing a simplified torque characteristic of the clutch, one can see that the touch point of the clutch needs to be reached before the clutch can control torque.

To perform powershifts the active clutch can only reduce its torque capacity if the incoming clutch has already taken over this torque from the active clutch. The incoming clutch needs to perform a clutch preparation phase to be able to transfer torque. From drivers perspective the preparation phase is only recognized as a delay, while the torque handover phase only results in a very smooth change in acceleration. FIG. 4 shows such a conventional double clutch shift performed as powershift.

The target of conventional clutch preparation methods is to control the actuators of a clutch such that it is ready to transfer torque, being the clutch is brought close to its touch point. Bringing the clutch to its touch point can be achieved with various control methods like there are model based or deterministic approaches. As one can see in FIG. 5 the output of such a clutch preparation strategy can be to over actuate the clutch, being actuated more than needed for the touch point, for a time which is shorter than the expected time, or a time which a model predicts, to reach the touch point.

When the clutch is prepared, so the touch point is reached, the incoming clutch can start to take over torque from the active clutch. The torque capacity of the active clutch is reduced in a way that it is guaranteed that the complete engine torque is transferred through one of the 2 clutches 2a or 2b and that the active clutch is not longer transferring torque when the incoming clutch torque capacity has reached the engine torque.

It is therefore an object of the present invention to provide a method of controlling a double clutch transmission that increases the responsiveness of such a double clutch transmission by decreasing the total time of preparing the incoming clutch and taking over the torque from the active clutch.

In order to achieve this object, the invention provides a method as defined above, which uses the following steps: First, the incoming clutch is prepared so as to be ready for taking over torque transmission, wherein the preparation is achieved by over actuating the incoming clutch. Then, a feedback signal from the incoming clutch is provided which indicates that the incoming clutch is prepared and has taken over at least a part of the engine torque from the active clutch. Then, the active clutch is shut off in a non-proportional way based on receiving the feedback signal. This results in reduced delay when switching torque transmission from one of the clutches to the other clutch.

Preferably, a calibration step is used for determining the amount of over actuation. This helps in performing a quick yet smooth change from one clutch to the other.

According to an advantageous embodiment, the calibration step is performed as a function of the engine speed, the throttle pedal position and/or other, as these parameters greatly influence the change from one clutch to the other.

Preferably, the method includes deciding based on the feedback signal of the incoming clutch that the clutch is prepared and transferring the complete or at least a part of the engine torque.

The above object is further achieved with a clutch control system for controlling a double clutch, the system comprising a transmission control unit (TCU) and at least two non-proportional valves, a first of the non-proportional valves being associated with a clutch actuation device for a first clutch, and a second of the non-proportional valves being associated with a clutch actuation device for a second clutch.

DETAILED DESCRIPTION

Figure 1:
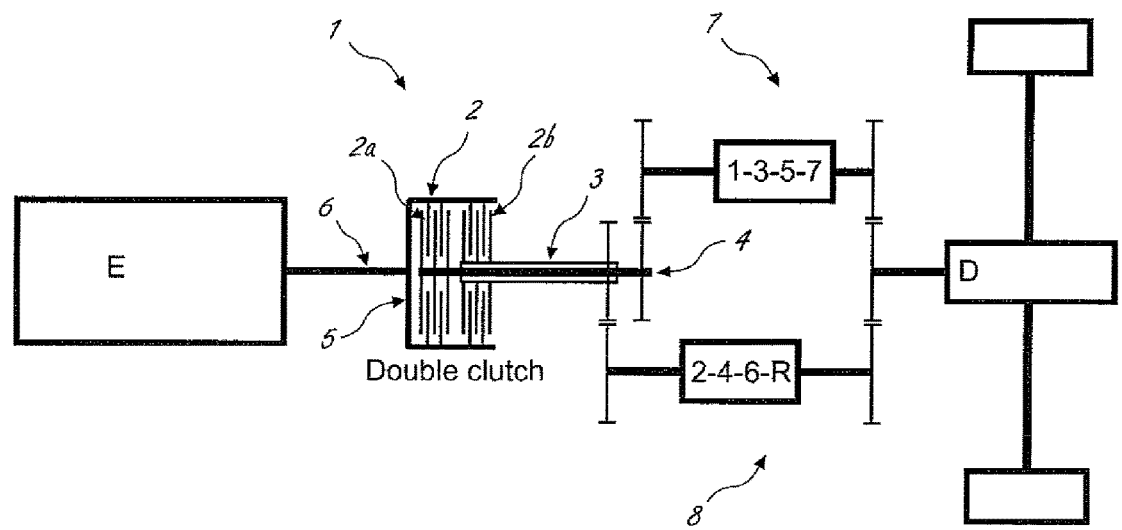
FIG. 1 shows a block diagram of a double clutch transmission installed in a car.
Figure 2:
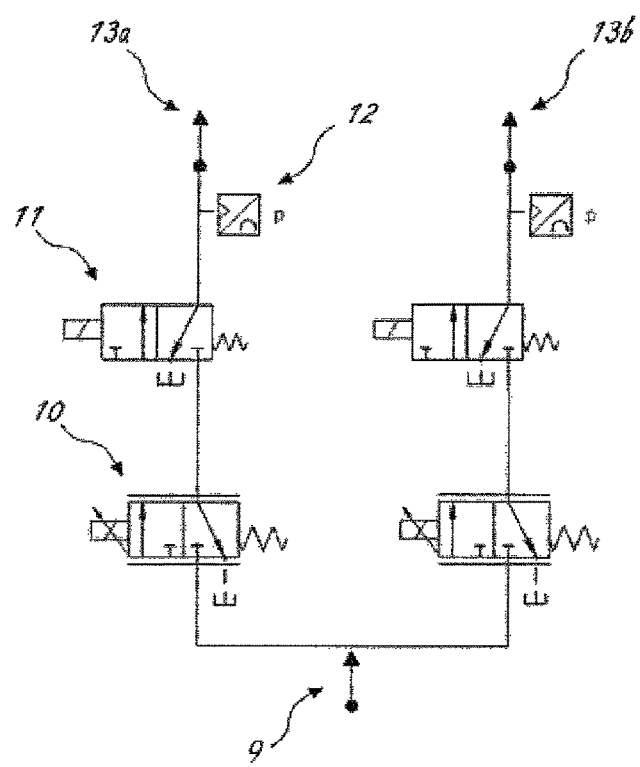
FIG. 2 shows an example of a hydraulic layout for controlling a double clutch.
Figure 3:
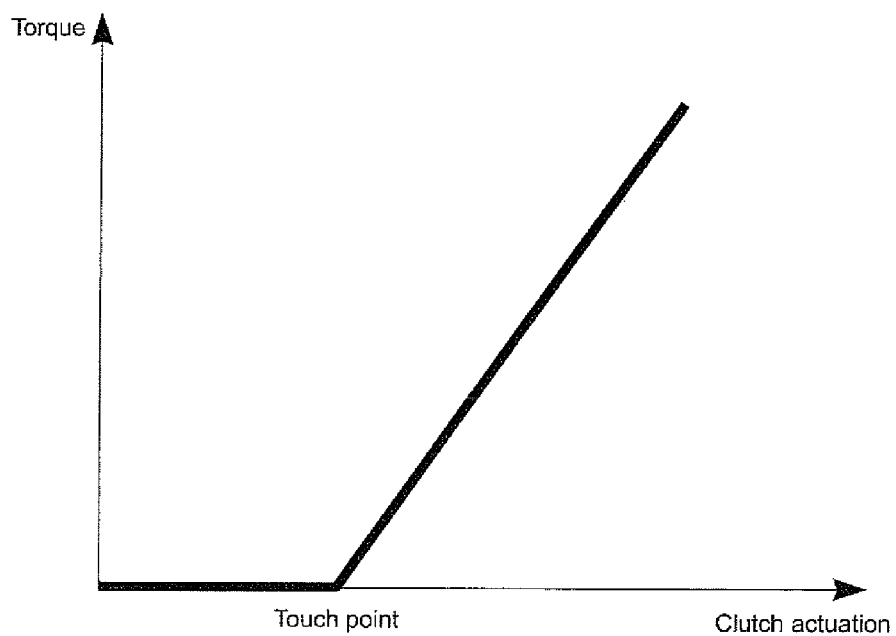
FIG. 3 shows a graph explaining the touch point of a clutch as used in a double clutch transmission.
Figure 4:
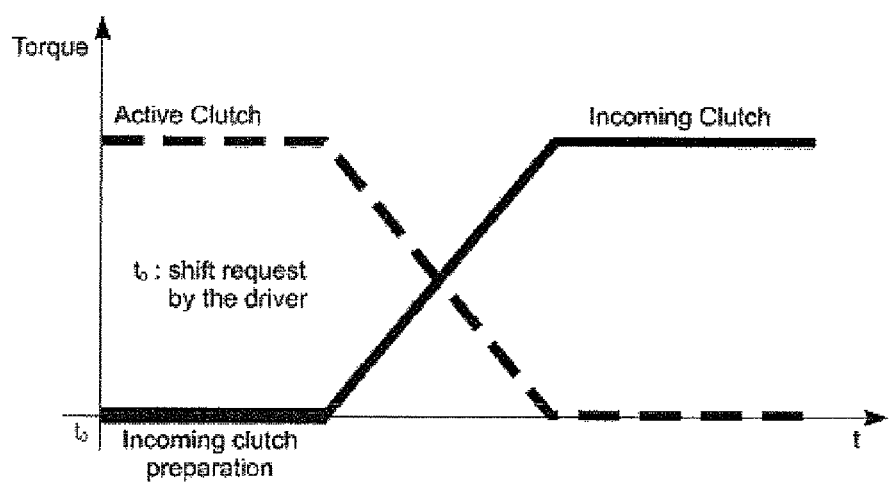
FIG. 4 shows a graph of a conventional clutch torque handover from the active to the incoming clutch.
Figure 5:
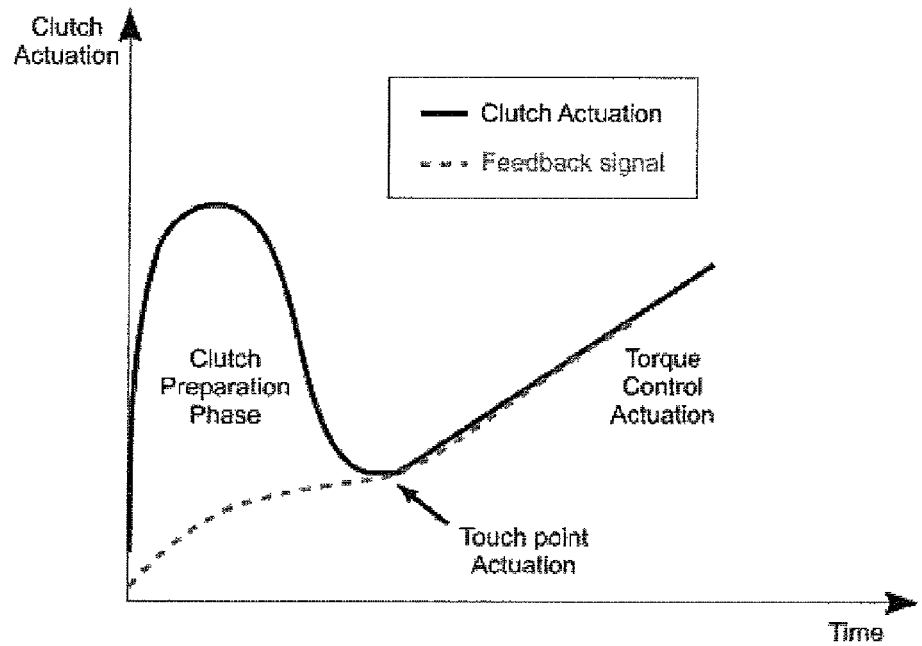
FIG. 5 shows a graph of the behaviour during a conventional clutch preparation phase.
Figure 6:
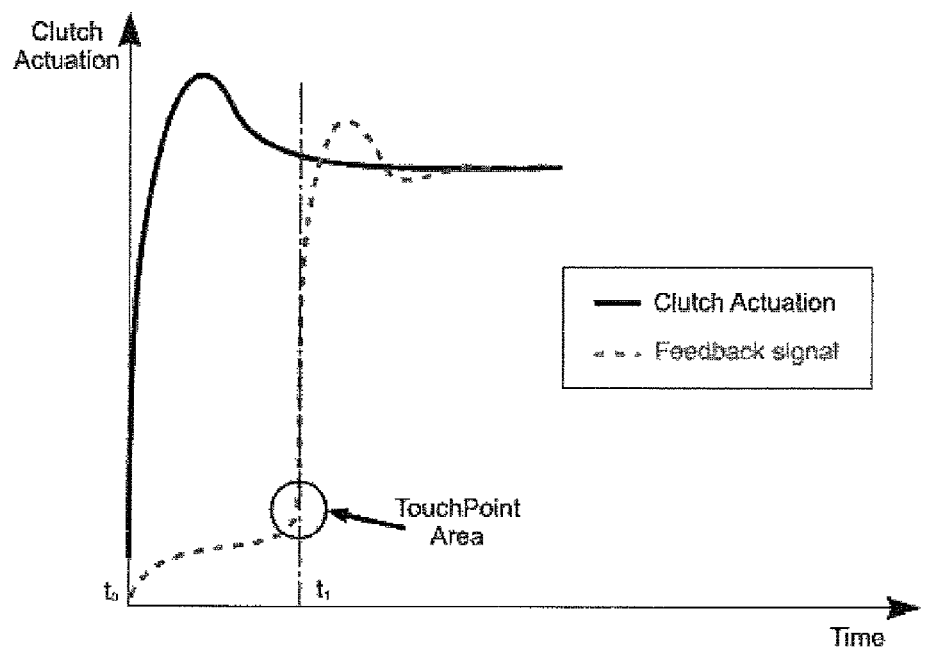
FIG. 6 shows a graph of the clutch preparation phase according to the present invention.

The method of the invention will now be described with reference to FIGS. 6 and 7. With the inventive method, a double clutch transmission can combine the preparation of the incoming clutch and the torque handover from the active clutch. As one can see in FIG. 6, this can be achieved by actuating the incoming clutch more than what is needed for the touch point (this can be even more than what is needed to transfer the engine torque). But instead of reducing this over-actuation before the touch point is expected to be reached, this over-actuation is maintained. This will lead to a fast preparation of the clutch and a very crisp torque capacity increase of that clutch. During this over-actuation phase, a feedback signal of the incoming clutch is monitored and used to decide when the incoming clutch is prepared and has fully or partially taken over the torque from the active clutch, at this moment the active clutch is shut off and also the over-actuation of the incoming clutch is stopped. When the over actuation of the incoming clutch is stopped it can be actuated like in conventional power shifts after the torque handover, to complete the shift.

The term "over-actuation" as used here is in particular to be understood as referring to applying more current to the hydraulic valve controlling the respective clutch, then needed in a certain condition. In the application this means that during the clutch preparation phase, the current applied to the hydraulic valve is more then the steady state current which would be needed for the touch point of the clutch, it is even more then what would be needed to transfer the full engine torque.

The shut-off of the active clutch is performed in a non proportional way being by using an on-off actuator 11 or by controlling a proportional actuator 10 with a step or a combination of these two.

Figure 7:
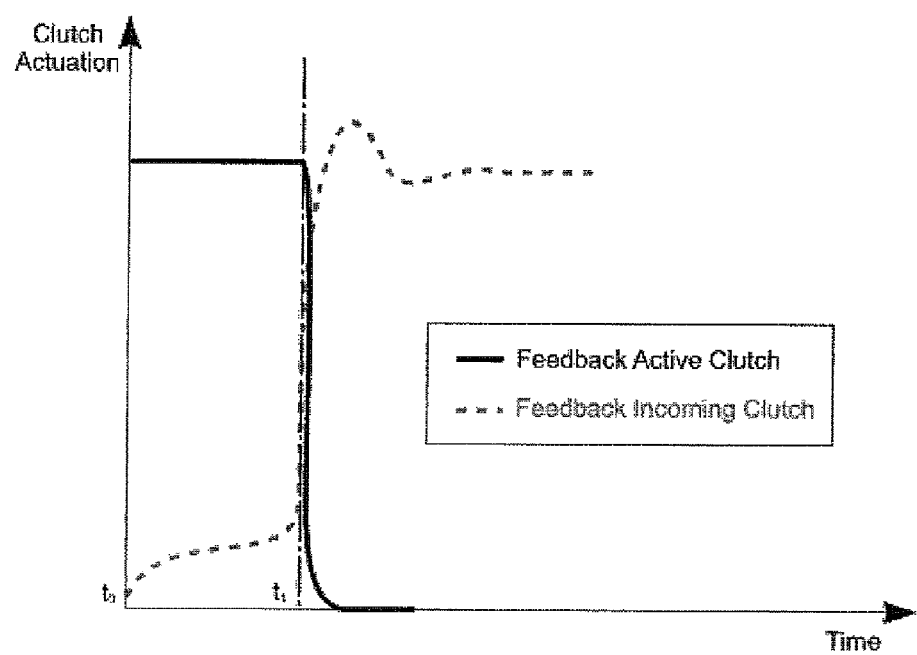
FIG. 7 shows a graph of the active and incoming clutch pressure feedback signals according to the current invention.

FIG. 7 shows the feedback signals of the active and incoming clutch. At time $t_1$ the control method recognises the incoming clutch is prepared and takes over at least a part of the engine torque from the active clutch. At this moment the active clutch is shut down, which can be seen in the feedback pressure.

EP 1 717 473 shows the general hydraulic lay-out which can be used for actuating the double clutch. The disclosure of this document is explicitly incorporated by reference.

LIST OF REFERENCE SIGNS

| 1 | double clutch transmission |
| 2 | double clutch |
| 2a, 2b | clutches of double clutch 2 |
| 3 | hollow shaft |
| 4 | central output shaft |
| 5 | clutch housing |
| 6 | crank shaft |
| 7, 8 | gear sets |
| 9 | Pressure supply |
| 10 | Proportional actuator |
| 11 | Non-proportional actuator |
| 12 | Pressure sensor |
| 13a, 13b | Connection to clutches |
| TCU | Transmission Control Unit |

The invention claimed is:

1. A method of transferring torque from an active clutch to an incoming clutch in a double clutch transmission, the method comprising:
   preparing the incoming clutch so as to be ready for taking over the torque transmission from the active clutch, wherein the preparation is achieved by over actuating the incoming clutch;
   maintaining the over actuation of the incoming clutch before a touch point for engaging the incoming clutch is reached;
   receiving a feedback signal which indicates that all of the torque transmission has been transferred to the incoming clutch from the active clutch while the incoming clutch is over actuated; and
   shutting off the active clutch based, at least in part, on receiving the feedback signal.

2. The method according to claim 1, further comprising determining an amount of the over actuation as a function of one or both of an engine speed and a throttle pedal position.

3. The method according to claim 1, further comprising transferring all the torque transmission from the active clutch to the incoming clutch.

4. The method of claim 1, wherein maintaining the over actuation of the incoming clutch comprises applying a current to a hydraulic valve associated with the incoming clutch, and wherein the current is greater than a steady state current associated with operation of the incoming clutch when the incoming clutch reaches the touch point for engaging the incoming clutch.

5. The method of claim 1, wherein over actuating the incoming clutch comprises applying an amount of clutch actuation to the incoming clutch that is greater than a threshold amount of clutch actuation associated with fully taking over the torque transmission.

6. The method of claim 1, further comprising reducing the over actuation of the incoming clutch to a second over actuation amount prior to transferring the engine torque from the active clutch to the incoming clutch, wherein the second over actuation amount of the incoming clutch is greater than a touch point actuation amount for engaging the incoming clutch, and wherein at least part of the torque transmission is taken over by the incoming clutch while the incoming clutch is actuated at the second over actuation amount.

7. A clutch control system for transferring torque, the system comprising:
   a first actuation device configured to actuate an active clutch;
   a second actuation device configured to actuate an incoming clutch; and
   a transmission control unit (TCU) configured to:
      over actuate the incoming clutch, via the second actuation device, in preparation for transferring torque from the active clutch to the incoming clutch;

maintain the over actuation of the incoming clutch before a touch point for engaging the incoming clutch is reached; and shut off, via the first actuation device, the active clutch based, at least in part, on a feedback signal which indicates that all of the torque transmission has been transferred to the incoming clutch from the active clutch while the incoming clutch is over actuated.

8. The clutch control system of claim 7, wherein the first actuation device comprises a first non-proportional valve, wherein the second actuation device comprises a second non-proportional valve, and wherein the active clutch is shut off in a non-proportional way.

9. The clutch control system of claim 8, wherein the first actuation device further comprises a first proportional actuator, wherein the first proportional actuator controls an amount of actuation of the active clutch when the first non-proportional valve is on, wherein the second actuation device further comprises a second proportional actuator, and wherein the second proportional actuator controls the amount of actuation of the incoming clutch when the second non-proportional valve is on.

10. The clutch control system of claim 7, further comprising a hydraulic valve associated with the incoming clutch, wherein an amount of current greater than an amount of current associated with the incoming clutch reaching the touch point is applied to the hydraulic valve.

11. The clutch control system of claim 10, wherein the amount of current applied to the hydraulic valve is greater than an amount of current associated with transferring all the torque to the incoming clutch.

12. The clutch control system of claim 10, wherein the amount of current applied to the hydraulic valve is selected based on one or both of a speed of the engine and a throttle pedal position.

13. The clutch control system of claim 7, wherein the TCU is further configured to reduce an amount of actuation of the incoming clutch prior to maintaining the over actuation of the incoming clutch.

14. An apparatus for transferring torque from an active clutch to an incoming clutch in a double clutch transmission, the apparatus comprising:

means for over actuating the incoming clutch in preparation for transferring torque from the active clutch to the incoming clutch, wherein the over actuation of the incoming clutch is maintained before a touch point for engaging the incoming clutch is reached; and means for shutting of the active clutch based, at least in part, on a feedback signal which indicates that all of the torque transmission has been transferred to the incoming clutch from the active clutch while the incoming clutch is over actuated.

15. The apparatus of claim 14, further comprising means for reducing actuation of the incoming clutch to an over actuation amount prior to transferring the engine torque from the active clutch to the incoming clutch, wherein the over actuation amount of the incoming clutch is greater than a touch point actuation amount.

16. The method according to claim 15, wherein the means for reducing comprises means for reducing an amount of current applied to a hydraulic valve associated with the incoming clutch.

17. The method according to claim 16, wherein the amount of current applied to the hydraulic valve is reduced to a second amount of current that is greater than or equal to an amount of current associated with transferring all of the engine torque to the incoming clutch.

18. The apparatus of claim 14, further comprising means for receiving a feedback signal from the incoming clutch and wherein it is decided, based on the feedback signal, that all of the engine torque has been transferred from the active clutch to the incoming clutch while the incoming clutch is actuated at an over actuation amount.

19. The apparatus according to claim 18, further comprising means for determining the over actuation amount of the incoming clutch as a function of one or both of an engine speed and a throttle pedal position.

20. The apparatus of claim 14, further comprising a hydraulic valve associated with the incoming clutch, wherein an amount of current applied to the hydraulic valve is selected based on one or both of the engine speed and the throttle pedal position.

* * * * *